United States Patent
Fujibayashi et al.

(10) Patent No.: US 6,897,626 B2
(45) Date of Patent: May 24, 2005

(54) SYNCHRONOUS CONTROLLER

(75) Inventors: Kentaro Fujibayashi, Musashino (JP); Tetsuo Hishikawa, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/735,705

(22) Filed: Dec. 16, 2003

(65) Prior Publication Data

US 2004/0128022 A1 Jul. 1, 2004

(30) Foreign Application Priority Data

Dec. 19, 2002 (JP) ....................... 2002/367603

(51) Int. Cl.$^7$ .................. B23Q 15/00; G05B 19/18
(52) U.S. Cl. ................ 318/85; 318/567; 318/568.2; 318/571
(58) Field of Search .............. 318/39, 41, 46, 318/85, 567, 568.2, 569–579, 600

(56) References Cited

U.S. PATENT DOCUMENTS

| | | | |
|---|---|---|---|
| 3,593,615 A | * 7/1971 | Shelton ...................... | 409/80 |
| 4,564,410 A | 1/1986 | Clitheros et al. | |
| 4,587,607 A | * 5/1986 | Kurakake ................... | 700/169 |
| 4,739,344 A | * 4/1988 | Sullivan et al. ............ | 346/76.1 |
| 5,051,913 A | 9/1991 | Kume et al. | |
| 5,254,923 A | * 10/1993 | Kanitani ................ | 318/568.11 |
| 5,340,433 A | 8/1994 | Crump | |
| 6,330,493 B1 | * 12/2001 | Takahashi et al. ......... | 700/245 |
| 6,340,875 B1 | 1/2002 | Watanabe et al. | |
| 6,434,448 B1 | * 8/2002 | Kosaka et al. .............. | 700/245 |

FOREIGN PATENT DOCUMENTS

| | | |
|---|---|---|
| DE | 195 38 826 A1 | 4/1997 |
| EP | 083327 A3 | 4/1998 |
| EP | 1 038 640 A2 | 9/2000 |

* cited by examiner

*Primary Examiner*—Bentsu Ro
(74) *Attorney, Agent, or Firm*—Staas & Halsey LLP

(57) ABSTRACT

A synchronous controller capable of easily controlling a slave axis in synchronism with a master axis performing a composite motion of a plurality of axes. Motion commands for two axes X, Y constituting the master axis are subject to interpolation/distribution and acceleration/deceleration processing, to determine distribution motion amounts, and the determined amounts of motion of the two axes X, Y constituting the master axis for every interpolation period are combined to determine an amount of motion M of the master axis, from which is determined an amount of motion of the slave axis for every interpolation/distribution period. The determined amounts of motion of the X, Y and slave axes are output to respective servo control means, thus driving the respective axes. In case the master axis is constituted by a means driven by external X and Y axes, amounts of motion of the external X and Y axes for every predetermined period are detected by detectors, and used, instead of the distribution motion amount, to determine an amount of motion M of the master axis from which an amount of motion of the slave axis is determined to drive the slave axis.

2 Claims, 3 Drawing Sheets

SYNCHRONOUS CONTROLLER

BACKGROUND OF THE INVENTION

1. Field of the Invention

The present invention relates to a synchronous controller for causing a slave axis (means for moving a slave element) to synchronously follow a master axis (means for moving a master element), and more particularly, to a synchronous controller in which an operation of a master axis is composed of operations of a plurality of axes.

2. Description of Related Art

As a method for moving a slave element to synchronously follow a motion of a master element as a reference element, there is known a method of controlling master and slave axes, these axes respectively serving as means for moving the master element and means for moving the slave element to synchronously follow the master element. This control method is referred to as electronic cam since it electrically achieves an operation equivalent to that of a cam and a cam follower which moves to follow rotation of the cam.

In the synchronous control of master and slave axes in which the master axis serves as means for moving a tool or the like, the motion of the master axis is determined as a combination of motions of a plurality of axes. For example, in a case where X and Y axes individually drive the tool to move in the perpendicular X- and Y-axis directions, a motion of the tool is realized by interpolation of the X and Y axes.

As for this kind of master axis serving as a driving mechanism for the tool, etc. and operated by interpolation of the plurality of axes, a control mode is conventionally adopted in which the master and slave axes are operated in synchronism with an imaginary axis which is provided upwardly to the master axis.

However, such synchronous control for master and slave axes using the imaginary axis is disadvantageous in that it requires two pairs of axes, i.e. the imaginary and master axes and the imaginary and slave axes, resulting in a more complicated arrangement than the basic arrangement only requiring one pair of axes, i.e. the master and slave axes. Furthermore, additional control for the imaginary axis makes the program and sequence complicated.

For the master axis control in which a combined motion of the plurality of axes is controlled by an external controller, there is not any method for synchronously controlling the master and slave axes using the imaginary axis.

SUMMARY OF THE INVENTION

The present invention provides a synchronous controller capable of easily controlling a slave axis in synchronism with a master axis, even in a case where a motion of the master axis is achieved by a composite motion of a plurality of axes.

According to one aspect of this invention, a synchronous controller comprises: a master-axis motion amount calculation section for calculating a motion command amount of a master axis by combining motion command amounts of a plurality of axes at every predetermined period; and a synchronous processing section for calculating a motion command amount of the slave axis at every predetermined period based on the motion command amount of the master axis calculated by the master-axis motion amount calculation section to be outputted for the slave axis, whereby the slave axis can be controlled to synchronously follow the master axis which performs a composite motion of the plurality of axes.

According to another aspect of the present invention, a synchronous controller comprises: a master-axis motion amount calculation section for calculating a motion amount of the master axis by combining motion amounts detected by detectors of the plurality of axes for every predetermined period; and a synchronous processing section for calculating a motion amount of the slave axis at every predetermined period based on the motion amount of the master axis calculated by the master-axis motion amount calculation section to be outputted for the slave axis, whereby the slave axis can be controlled to synchronously follow the master axis which performs a composite motion of the plurality of axes in an external machine.

DETAILED DESCRIPTION

Figure 1:
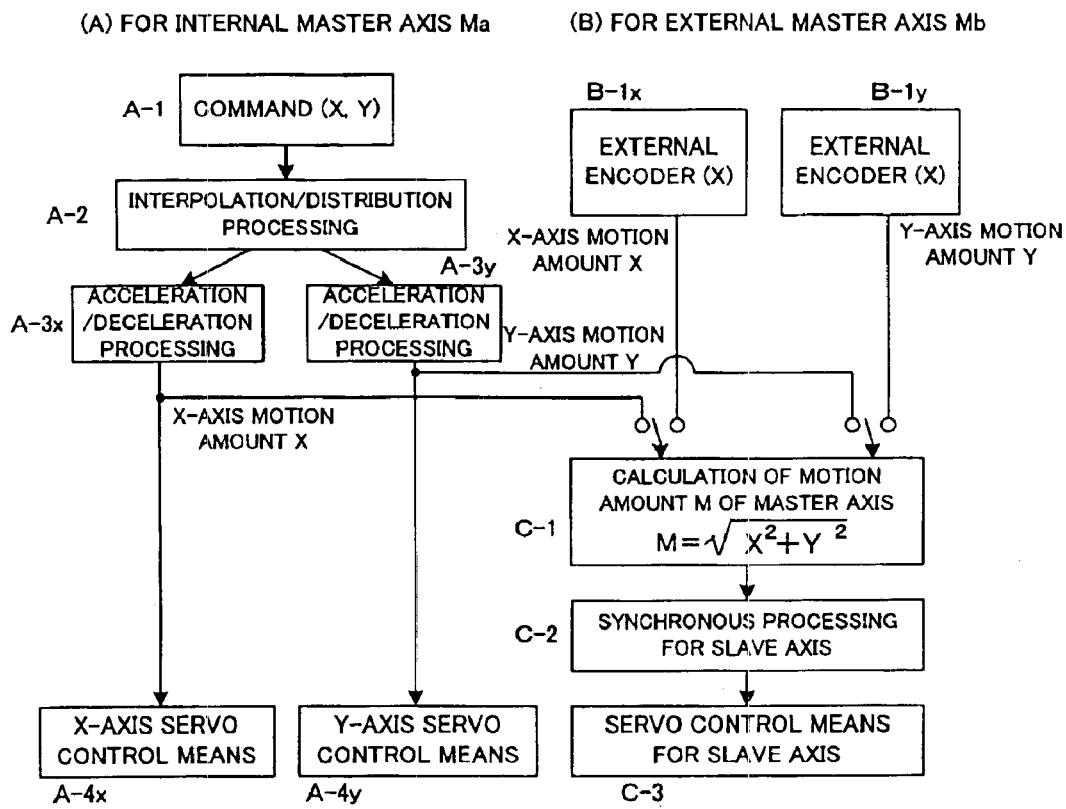
FIG. 1 is a view for explaining the operational principle of the present invention.

FIG. 1 is a view for explaining the operational principle of this invention. In FIG. 1, there are exemplarily shown a case where the master axis is constituted by an internal master axis Ma, i.e., a means that is driven by motions of two perpendicular axes (X- and Y-axes) controlled by a synchronous controller, and a case where the master axis is constituted by an external master axis Mb, i.e., a mechanism that is driven by a plurality of axes (two axes, i.e., perpendicular X- and Y-axes) controlled by an external controller other than the synchronous controller.

In case the internal axis Ma serves as master axis, interpolation/distribution processing (A-2) is as conventionally performed on the basis of, e.g., programmed motion commands (A-1) of the X- and Y-axes that constitute the master axis, to determine motion commands X, Y for every predetermined interpolation/distribution period. Then, the motion commands X, Y are subject to acceleration/deceleration processing (A-3x, A-3y), and the resultant motion commands X, Y are output to an X-axis servo control means (A-4x) and a Y-axis servo control means (A-4y), respectively, as in the conventional case. In the above example, the acceleration/deceleration processing is performed after the interpolation. However, the acceleration/deceleration processing may be made before the interpolation, and in that case, the interpolation/distribution processing is performed after the acceleration/deceleration processing.

Based on the motion commands having been subject to the acceleration/deceleration processing, an amount of motion M of the master axis is calculated (C-1). That is, to determine the amount of motion M of the master axis for every predetermined interpolation/distribution period, calculation is made in accordance with the following equation (1):

$$M = (X^2 + Y^2) \qquad (1)$$

On the basis of the amount of motion M of the master axis thus calculated, synchronous processing is performed to determine and output an amount of motion of the slave axis (C-2). To this end, the amount of motion S of the master axis for every predetermined interpolation/distribution period is determined by multiplying the amount of motion M of the master axis by a predetermined proportional coefficient, or it is determined as a function of the amount of motion M of the master axis. Then, the amount of motion of the slave axis thus determined is output to a servo control means for the slave axis (C-3).

Subsequently, the aforesaid processing is repeatedly performed at intervals of the predetermined interpolation/distribution period, whereby the motion amounts are output to the servo control means for the X and Y axes that constitute the master axis and to the servo control means for the slave axis, respectively. Each of these servo control means drives a corresponding one of axis servomotors, thus making it possible to drive the slave axis in synchronism with the master axis constituted by a tool or the like that is driven by the X and Y axes.

On the other hand, as for the master axis consisting of means driven by a plurality of axes that are drivingly controlled by an external controller, amounts of motion of these axes are read at intervals of a predetermined period, and combined by calculation to determine an amount of motion M of the master axis. In FIG. 1, this example where the master axis consists of a mechanism driven by perpendicular external X- and Y-axes is shown under the indication "(B) For external master axis Mb."

Based on amounts of motion X, Y for every predetermined cycle that are detected by position/velocity sensors (B-1$x$, B-1$y$) such as pulse coders attached to external X- and Y-axes constituting the master axis, an amount of motion M of the master axis is calculated in accordance with the aforementioned equation (1) (C-1). On the basis of the thus determined amount of motion M of the master axis, an amount of motion of the slave axis is calculated as described above (C-2), and output to the slave axis servo control means (C-3).

As explained above, amounts of motion of the external X- and Y-axes are determined at intervals of the predetermined period, and an amount of motion M of the master axis for the predetermined period is calculated. From the amount of motion M, an amount of motion of the slave axis for the predetermined period is calculated and output to the slave axis servo control means that drives a servomotor which in turn drives the slave axis, whereby the slave axis is controlled in synchronism with the external master axis.

Figure 2:
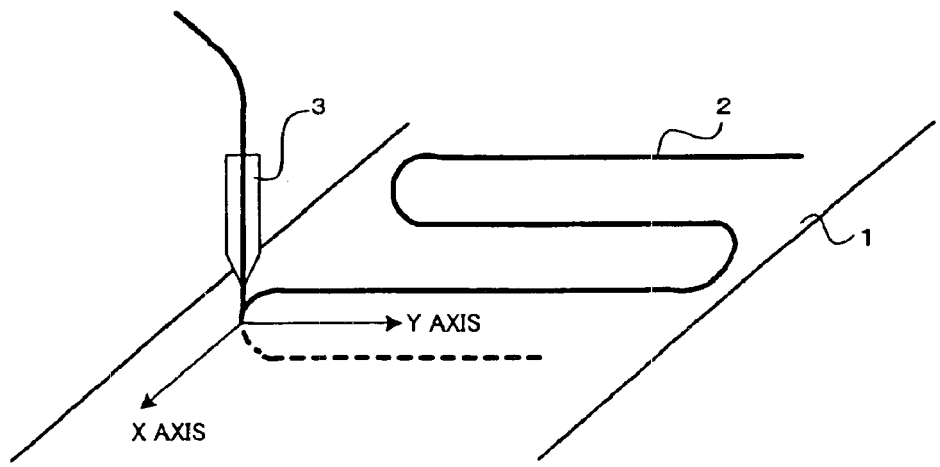
FIG. 2 is a view for explaining an exemplified work performed by a synchronous controller according to an embodiment of the present invention.

FIG. 2 shows an example of work performed under the control of a synchronous controller of one embodiment of the present invention. In this exemplified work, a heating wire 2 is affixed to an electric carpet 1 while the wire is reciprocated. To this end, a nozzle 3 is driven in the perpendicular X- and Y-axes on a surface of the carpet 1 to which the heating wire is affixed, and the heating wire 2 is fed in the Z-axis perpendicular to the X-Y plane (i.e., the heating wire attached surface of the carpet (hereinafter referred to as carpet plane)), to be affixed to the surface of the carpet 1.

In this example, the heating wire 2 must be fed as the nozzle 3 is moved in the direction of a vector sum of X- and Y-axis motions. In other words, the feed speed of the heating wire 2 must be the same as a vector sum of moving speeds of the nozzle 3 in the X- and Y-axis directions. It is assumed here that the nozzle 3 serves as the master axis, that is, the master axis consists of the nozzle 3 whose motion is determined as the composition of its X- and Y-axis motions.

Figure 3:
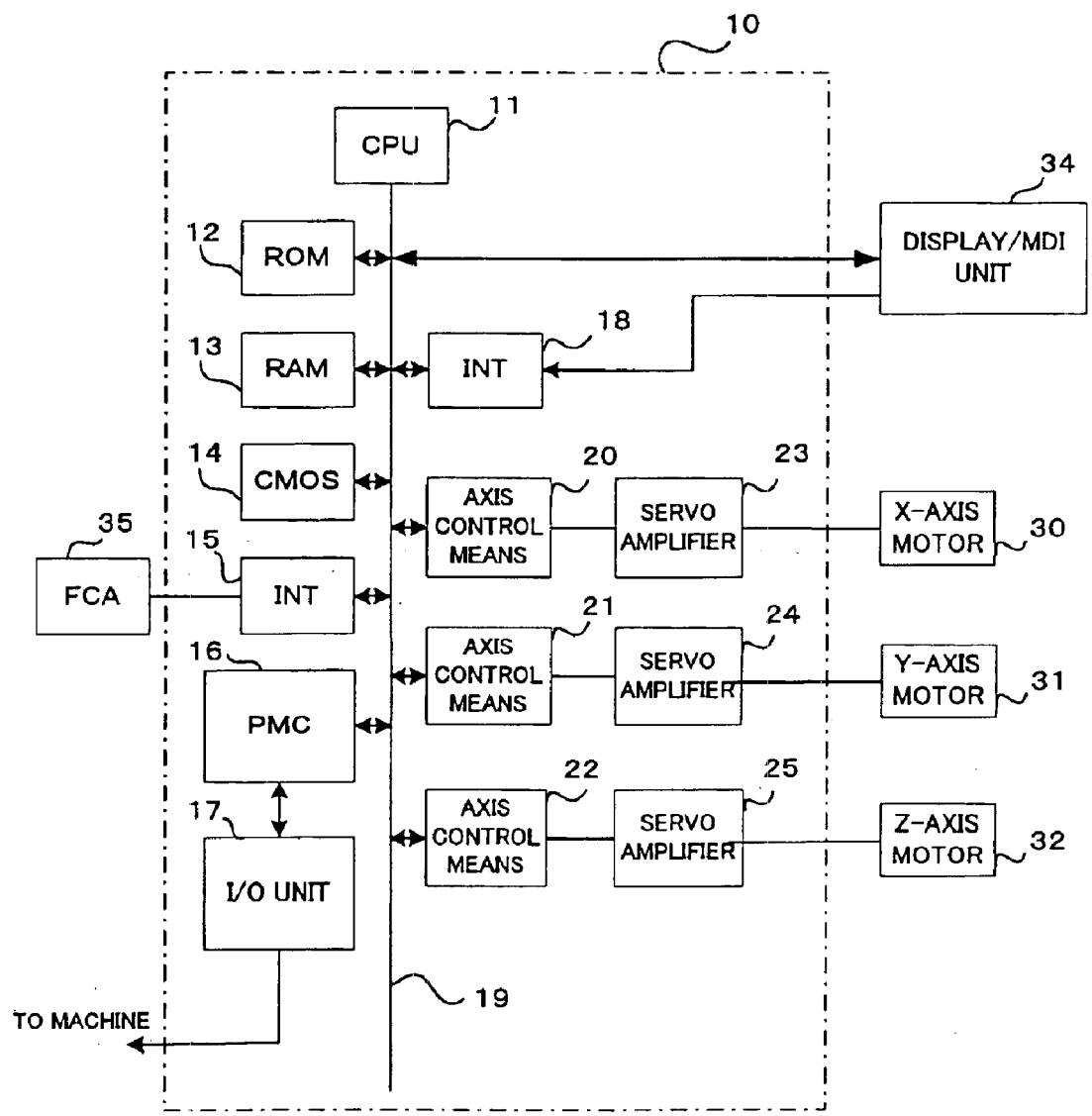
FIG. 3 is a block diagram showing an essential part of the controller of the embodiment.

FIG. 3 is a block diagram showing one embodiment of a numerical controller that constitutes a synchronous controller for performing the work shown in FIG. 2. A CPU 11 is a processor used for the overall control of the controller 10. Specifically, the CPU 11 reads, via a bus 19, a system program stored in a ROM 12, and controls the controller in accordance with the system program. A RAM 13 is stored with temporal data for calculation or display and various data that are input by an operator through a display/MDI unit 34. A CMOS memory 14 is backed up by a battery, not shown, and is hence constituted as a non-volatile memory capable of holding stored contents, even if the power to the numerical controller 10 is shut off. The CMOS memory 14 stores a machining program, etc. that are read through an interface 15 or that are input through the display/MDI unit 34.

The interface 15 is used to connect external equipment 35 such as adapter with the controller 10. A machining program, etc. are read from the external equipment 35, through which a machining program edited in the controller 10 may be stored in an external storage means. A programmable controller (PC) 16 operates in accordance with a sequence program stored in the controller 10, and outputs signals to auxiliary equipment of a machine tool through an I/O unit 17, thus controlling the equipment. The PC 16 also receives signals from switches, etc. of an operation panel provided on a main body of the machine tool, performs required signal processing, and outputs the processed signals to the CPU 11.

The display/MDI unit 34 is a manual data input device that is provided with a display, a keyboard, etc. An interface 18 receives commands and data from the keyboard of the display/MDI unit 34 and outputs the same to the CPU 11.

Axis control means 20–22 receive motion command amounts for the respective axes from the CPU 11, and output commands to servo amplifiers 23–25, respectively. In response to the commands, the servo amplifiers 23–25 drive axis servomotors 30–32. These axis servomotors 30–32 having position/velocity detectors feed position/velocity feedback signals from their position/velocity detectors back to the axis control means 20–22 for position/velocity feedback control. In FIG. 3, illustration of position/velocity feedback is omitted.

The X- and Y-axis servomotors 30, 31 drive the nozzle 3 in the X- and Y-axis directions, respectively, and the Z-axis servomotor 32 serves as a servomotor for driving a feed means for feeding a heating wire from the nozzle 3.

The above-described arrangement is the same as the conventional numerical controller. The synchronous controller of this embodiment, constituted by such numerical controller, comprises a synchronous control program that is stored in the ROM 12 and a machining program, stored in the CMOS memory 14, for affixing a heating wire to a carpet.

Figure 4:
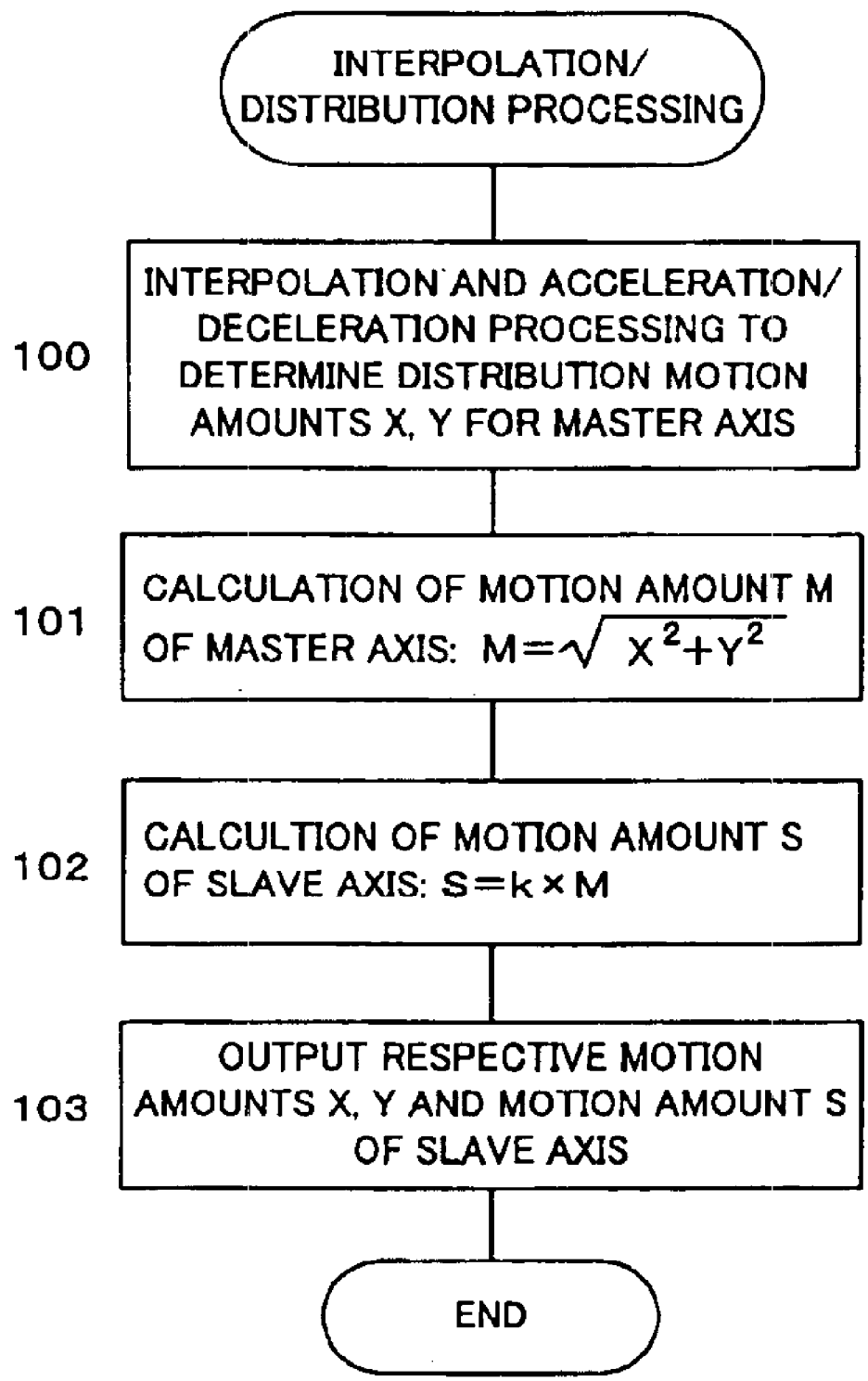
FIG. 4 is a flowchart of processing executed for every interpolation period in the embodiment.

FIG. 4 is a flowchart of processing that is executed for every interpolation period by the processor 11 of this embodiment.

First, the processor 11 reads, as conventionally, one block of the machining program and executes a command that is read therefrom. If a motion command is read, processing for interpolation/distribution and processing for acceleration/deceleration (before or after the interpolation) are as conventionally performed, to determine amounts of motion X, Y to be distributed to the X- and Y-axes constituting the master axis (Step 100). Next, on the basis of the thus determined distribution motion amounts X, Y, calculation of the equation (1) is performed to determine, as amount of motion M of the master axis, an amount of composite motion of the nozzle 3 on the carpet plane (Step 101).

As shown in the following equation (2), an amount of command motion S for the Z axis serving as the slave axis is then determined by multiplying the amount of motion M of the master by a predetermined proportional coefficient k (Step 102). The proportional coefficient k varies depending on the means for feeding a heating wire 2, more specifically, depending on how much amount the heating wire 2 is fed according to an amount of rotation of the Z-axis servomotor for driving the wire feed means. Thus, the amount of command motion S of the Z axis, which is required to feed the heating wire 2 in an amount corresponding to the amount of motion M of the master axis, is determined by multiplying the motion amount M by k.

$$S = k \times M \quad (2)$$

The thus determined amount of motion S of the slave axis is output to the axis control circuit 22 for drivingly controlling the Z-axis servomotor 32, and the amounts of motion X, Y of the X and Y axes determined at Step 100 are output to the axis control circuits 20, 21 for drivingly controlling the X- and Y-axis servomotors 30, 31, respectively, whereupon the processing in the present period is completed.

The respective axis control circuits 20–22 individually carry out position/velocity loop processing on the basis of the amounts of command motion received and the position/velocity feedback signals that are supplied from the position/velocity detectors, not shown, respectively attached to the servomotors 30–32, to drive the servomotors 30–32 through the servo amplifiers 23–25, thus moving the nozzle in the X and Y directions and feeding the heating wire 2 to coincide with the amount (velocity) of motion of the nozzle, whereby the heating wire 2 is affixed to the carpet 1.

Subsequently, until the machining program comes to end, the heating wire 2 is affixed while reciprocating the nozzle 3 on the carpet plane, as shown in FIG. 2, based on the machining program.

In the above-described embodiment, the master axis consists of the nozzle 3 driven by the X and Y axes that are controlled by the controller 10. On the other hand, for a case where the master axis consists, as previously mentioned, of a mechanism driven by a plurality of axes that are driven by an external controller, processing shown at Step 100 in FIG. 4 is executed to detect amounts of motion of the plurality of axes constituting the master axis by using detectors and to determine the amounts of motion for every predetermined cycle. Next, processing in Steps 101, 102 is executed to determine an amount of motion S of the slave axis, which is then output to axis control means for driving the slave axis.

For instance, in the example shown in FIG. 2, when the nozzle 3 is not moved and the carpet 1 is driven in the perpendicular X- and Y-axis directions by using an apparatus other than the synchronous controller, amounts of motion X, Y of X and Y axes driven by the apparatus are detected at intervals of a predetermined period, and the processing at Steps 101, 102 is performed to determine an amount of motion S of the slave axis which is output at Step 103 to an axis servo control means associated with the feeding of the heating wire 2.

In the above-described embodiment, mean that constitutes the master axis is comprised of a mechanism driven by two axes, i.e., the X and Y axes. However, in a case where the master axis is constituted by a means movable in a three dimensional space, the amount of motion of the master axis may be determined from a composite vector of motions of three perpendicular axes (X, Y and Z axes), and the slave axis may be driven accordingly.

In the aforementioned embodiment, a case has been explained where the slave axis is moved in synchronism with and in a predetermined proportional relation to the master axis. Alternatively, the slave axis may be moved as a predetermined function of motion of the master axis. For example, as proposed in Japanese Patent application No. 2002-297731 by inventors including the inventors of the present application, the slave axis may be drivingly controlled by using a multiplying factor, determined as a given function, for the slave axis with respect to the master axis.

The present invention makes it possible to simply and easily synchronize a motion of the slave axis for moving a slave element with a motion of the master axis for moving a master element to perform a composite motion of a plurality of axes. Even if the master axis serves as means for driving the master element by a composite motion of a plurality of axes of an external machine or apparatus, the slave axis can also be synchronously controlled with ease.

What is claimed is:

1. A synchronous controller for driving a slave axis to synchronously follow a master axis performing a composite motion of a plurality of axes, comprising:
   a master-axis motion amount calculation section for calculating a motion command amount of the master axis by combining motion command amounts of the plurality of axes at every predetermined period; and
   a synchronous processing section for calculating a motion command amount of the slave axis at every predetermined period based on the motion command amount of the master axis calculated by said master-axis motion amount calculation section to be outputted for the slave axis.

2. A synchronous controller for driving a slave axis to synchronously follow an operation of a master axis performing a composite motion of a plurality of axes, comprising:
   a master-axis motion amount calculation section for calculating a motion amount of the master axis by combining motion amounts detected by detectors of the plurality of axes for every predetermined period; and
   a synchronous processing section for calculating a motion amount of the slave axis at every predetermined period based on the motion amount of the master axis calculated by said master-axis motion amount calculation section to be outputted for the slave axis.

* * * * *

UNITED STATES PATENT AND TRADEMARK OFFICE
CERTIFICATE OF CORRECTION

PATENT NO. : 6,897,626 B2
DATED : May 24, 2005
INVENTOR(S) : Kentaro Fujibayashi et al.

It is certified that error appears in the above-identified patent and that said Letters Patent is hereby corrected as shown below:

Column 2,
Line 64, change "$M=(X^2+Y^2)$" to -- $M=(X^2+Y^2)^{1/2}$ --.

Signed and Sealed this

Twenty-first Day of March, 2006

JON W. DUDAS
*Director of the United States Patent and Trademark Office*